United States Patent

Koizumi

[11] Patent Number: 6,166,861
[45] Date of Patent: Dec. 26, 2000

[54] WIDE-ANGLE EYEPIECE LENS

[75] Inventor: Noboru Koizumi, Saitama, Japan

[73] Assignee: Fuji Photo Optical Co., Ltd., Saitama, Japan

[21] Appl. No.: 09/206,376

[22] Filed: Dec. 7, 1998

[30] Foreign Application Priority Data

Dec. 8, 1997 [JP] Japan ..................................... 9-354187

[51] Int. Cl.$^7$ ........................... G02B 25/00; G02B 13/18; G02B 9/34
[52] U.S. Cl. .......................... 359/644; 359/715; 359/774; 359/787
[58] Field of Search ..................................... 359/784, 785, 359/786, 787, 788, 789, 790, 643, 644, 645, 715, 774

[56] References Cited

U.S. PATENT DOCUMENTS

| 5,612,823 | 3/1997 | Koizumi | 359/644 |
| 5,875,057 | 2/1999 | Kato | 359/645 |

FOREIGN PATENT DOCUMENTS 9-54256  2/1997  Japan .

*Primary Examiner*—Scott J. Sugarman
*Attorney, Agent, or Firm*—Young & Thompson

[57] ABSTRACT

A wide-angle eyepiece lens having an angle of view greater than 60° comprises, in order from the object end, a first lens group including a positive power meniscus lens element with a concave object side surface, an overall negative power second lens group including a doublet comprising, in order from the object side, a negative power lens element and a positive power lens element, and an overall positive power third lens group, and satisfies the following conditions:

$$1.2 < f_1/f < 3.5$$

$$3 < -f_2/f$$

$$0.010 < 1/\upsilon_{2N} - 1/\upsilon_{2P}$$

$$1 < |R_3/f|$$

where
f is the overall focal length of the eyepiece lens;
$f_1$ is the overall focal length of the first lens group;
$f_2$ is the overall focal length of the second lens group;
$\upsilon_{2N}$ is the Abbe number of the negative power lens element of the second lens group;
$\upsilon_{2P}$ is the Abbe number of the positive lens element of the second lens group;
$R_3$ is the curvature of radius of the foremost object side surface of the second lens group.

9 Claims, 13 Drawing Sheets

WIDE-ANGLE EYEPIECE LENS

BACKGROUND OF THE INVENTION

1. Field of the Invention

The invention relates to a wide-angle eyepiece lens for a telescope such as a monocular and a binocular and, more particularly, to a wide-angle eyepiece lens having an angle of view greater than approximately 60° which makes an eyepiece lens compact.

2. Description of Related Art

One of wide-angle eyepiece lens used for optical instruments such as telescopes and binoculars that is described in Japanese Unexamined Patent Publication No 9-54256 has an angle of view greater than 60° has an eye-relief distance which is referred to an axial distance between an eye point and an apex of an eyepiece lens on the image side suitably long for telescopes of high magnification. A high-powered telescope such as of ten-odd magnifications is not always convenient for every observation circumstance. For example, because the high-powered telescope held by hands is apt to shake during observation due to, a narrow angle of view, there is a demand for a wide-angle eyepiece lens suitable for low-powered telescopes.

In general, such an eyepiece lens for a low-powered telescope has an eye relief distance longer than it needs and/or a large lens diameter, which makes it hard to utilize the eyepiece lens in a low-powered telescope. That is, because a low-powered telescope is equipped with an eyepiece lens whose focal length is longer than that of an eyepiece lens for a high-powered telescope due to the relationship that the magnification is equal to the focal length of a telescope divided by the focal length of an eyepiece lens, it has an unnecessarily long eye relief distance. Taking it into account that a light ray passes an eye point of the eyepiece lens, a long eye relief distance is accompanied by a proportional increase in diameter of the eyepiece lens. If the eyepiece lens having a short focal length described in Japanese Unexamined Patent Publication No 9-54256 which provides properly long eye relief distances at high magnifications provides unnecessarily long eye relief distances when used at low magnifications and puts the eyepiece lens under the necessity of including a large diameter of lens element. For example, it is well known in the art to use as an evaluation value of compactness of a lens a lens diameter ratio (hmax/f) which is referred to a ratio of the distance of a principal ray passing through an eye point at a specified incident angle from the optical axis at the lens relative to the focal length of the lens. The smaller the lens diameter ratio (hmax/f), the more the lens is compact. The eyepiece lens described in Japanese Unexamined Patent Publication No 9-54256 has a lens diameter ratio (hmax/f) of 0.7 for an angle of view of 60°, which indicates that the eyepiece lens has a large diameter.

The applicant of this application has proposed a wide-angle eyepiece lens providing a necessary eye relief distance in Japanese Patent Application No. 9-247701.

This wide-angle eyepiece has a large angle of view of approximately 65°. While the eyepiece lens provides balanced distribution of aberrations and in particular reduces aggravation of distortion and is structured by a reduced number of component lens elements to five to six, it has a great lens diameter ratio (hmax/f) of approximately 0.73 for an angle of view of 65°, which is always undesirable for compactness of the eyepiece lens. When employing the eyepiece lens for a telescope having low magnifications and a long focal length, it is hard to provide a light and compact telescope.

SUMMARY OF THE INVENTION

It is accordingly an object of the invention to provide a wide-angle eyepiece having a small diameter and a large angle of view greater than approximately 65° as well as well balanced distribution of aberrations.

The foregoing object of the invention is accomplished by a wide-angle eyepiece lens which includes, in order from the object side, a first lens group including a positive power meniscus lens element with a concave object side surface, an overall negative power second lens group including a doublet comprising, in order from the object side, a negative power lens element and a positive power lens element, and an overall positive power third lens group.

According to an aspect of the invention, the wide-angle eyepiece lens satisfies the following conditions:

$1.2 < f_1/f < 3.5$ $3 < -f_2/f$ $0.010 < 1/\upsilon_{2N} - 1/\upsilon_{2P}$ $1 < |R_3/f|$ where f is the overall focal length of the eyepiece lens;

$f_1$ is the overall focal length of the first lens group;

$f_2$ is the overall focal length of the second lens group;

$\upsilon_{2N}$ is the Abbe number of the negative power lens element of the second lens group;

$\upsilon_{2P}$ is the Abbe number of the positive lens element of the second lens group;

$R_3$ is the curvature of radius of the foremost object side surface of the second lens group.

According to a preferred embodiment, the overall negative power second lens group may includes a doublet comprising a negative power biconcave lens element and a positive power bi-convex lens element in order from the object side, or a positive power meniscus lens element with a object side concave surface and a negative power meniscus lens element with a concave object side surface, in order from the object side. Further, the first lens group may include a positive power meniscus lens element having an aspherical surface at at least one of opposite sides thereof.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
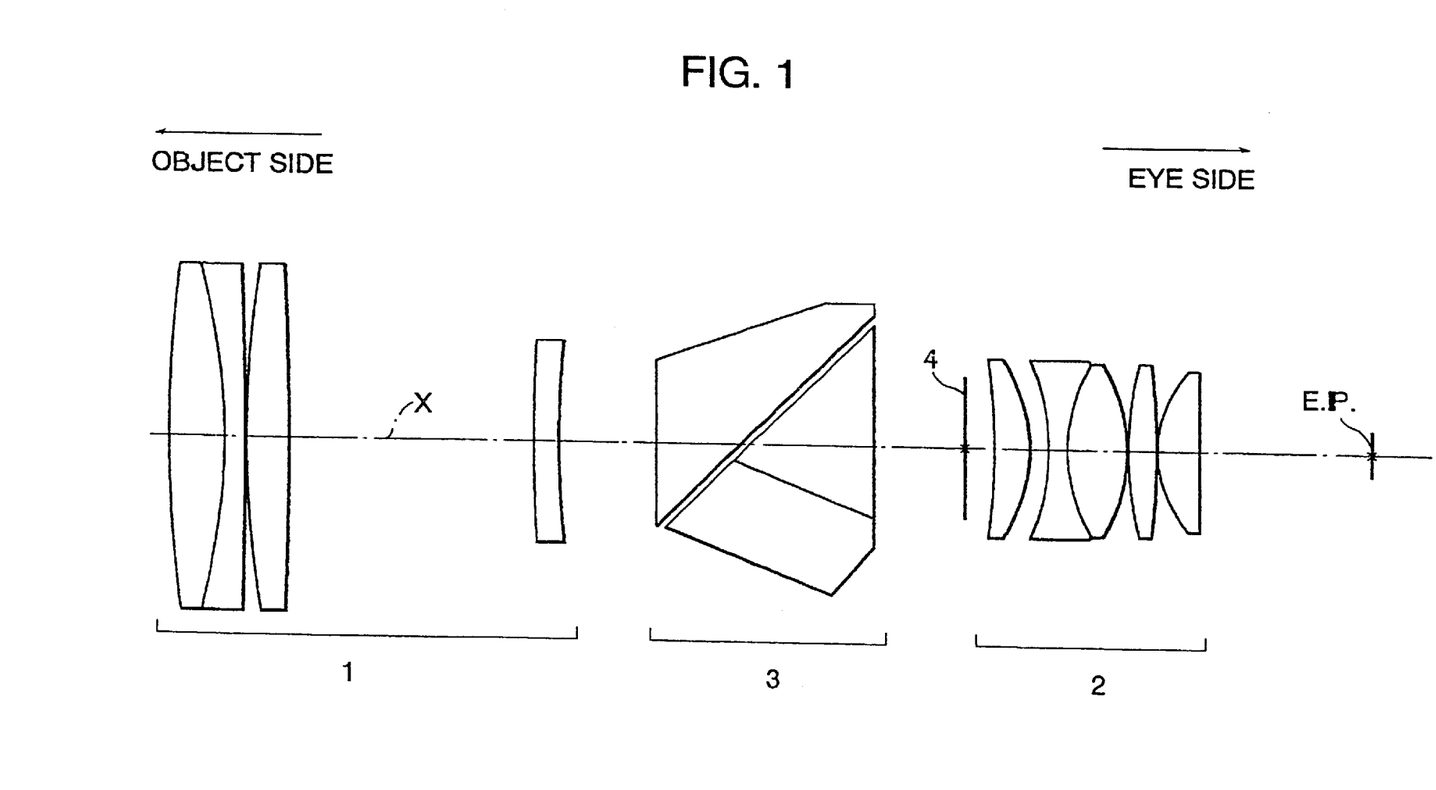
FIG. 1 is a schematic side view of a wide-angle eyepiece lens of the invention which is installed in a monocular.

Referring to the drawings in detail, in particular, to FIG. 1 showing an overall optical system suitably designed and adapted for a monocular, the monocular optical system includes an object lens 1, a wide-angle eyepiece lens 2 and an erecting prism 3 disposed between the objective and eyepiece lenses 1 and 2. An optical image of an object formed by the object lens 1 is focused on an image plane 4 and then projected on a plane at an eye point E.P. through the eyepiece lens 2. The optical image at the eye point E.P. is reflected in the eyes.

Figure 2:
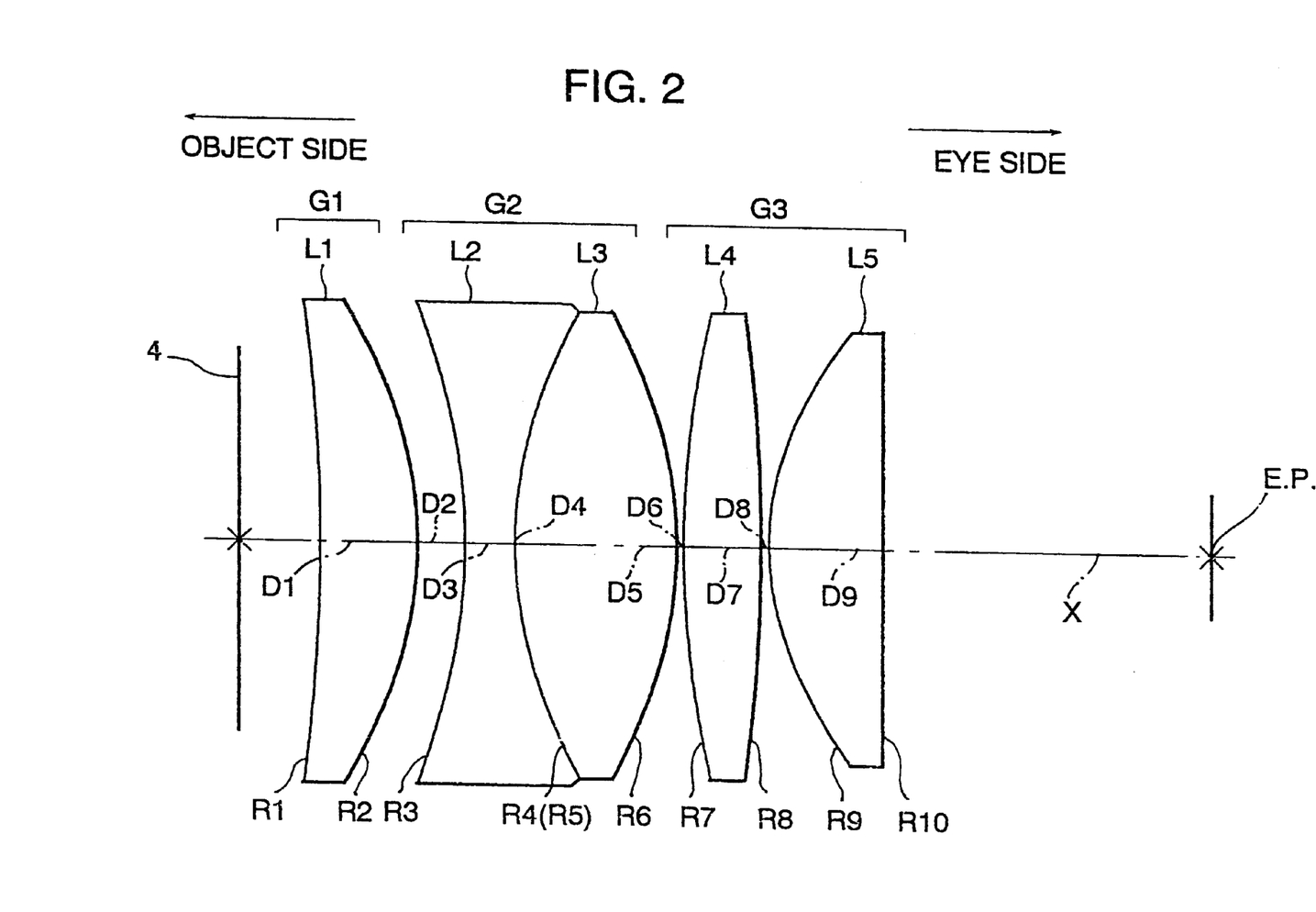
FIG. 2 is a schematic side view of a wide-angle eyepiece lens according an embodiment of the invention.

An eyepiece lens embodying the invention as exemplified in FIG. 2, which is designed as the wide-angle eyepiece lens 2 suitable for the monocular shown in FIG. 1. The eyepiece lens 2 includes, in order from the object side, a positive power first lens group G1, an overall negative power second lens group G2 and an overall positive power third lens group G3. The first lens group G1 comprises a positive meniscus lens element L1 with a concave object side surface. The second lens group G2 is an overall negative power doublet comprising a positive and a negative lens element, such as a positive biconcave lens element L3 with a large curvature at the eye side surface and a symmetrical bi-convex lens element L3 arranged in order from the object side. The third lens group G3 includes a bi-convex lens element L4 with a large curvature at the object side surface and a plane-convex lens element L5 having a convex object side surface. The components of group G1 in all embodiments of the invention must satisfy the following conditions (1) through (4):

$$1.2 < f_1/f < 3.5 \quad (1)$$

$$3 < -f_2/f \quad (2)$$

$$0.010 < 1/\upsilon_{2N} - 1/\upsilon_{2P} \quad (3)$$

$$1 < |R_3/f| \quad (4)$$

where f is the overall focal length of the eyepiece lens;
f1 is the overall focal length of the first lens group G1;
f2 is the overall focal length of the second lens group G2;
$\upsilon_{2N}$ is the Abbe number of the negative lens element of the second lens group G2;
$\upsilon_{2P}$ is the Abbe number of the positive lens element of the second lens group G2;
R3 is the curvature of radius of the foremost object side surface of the second lens group G2.

It is conventionally the basis for correcting astigmatism and providing a sufficiently long eye relief distance of an eyepiece lens to employ a negative lens element at the foremost end on the object side. Since light rays are diverged by the foremost negative lens element, lens elements following the negative lens element have to have large diameters. In the light of the above, the wide-angle eyepiece lens of the invention employs a positive lens element, i.e. the positive meniscus lens L1, at the foremost end on the object side operative to restrain divergence of light rays which is followed by a negative power lens, i.e. the overall negative lens group G2, operative to reduce the Petzval sum with an effect of correcting astigmatism. The positive meniscus lens L1 with a concave object side surface arranged at the foremost end on the object side balances the aberrations, in particular distortion, of the eyepiece lens. The overall negative power doublet employed for the second lens group G2 balances axial chromatic aberrations and chromatic difference of magnification.

The parameters set forth are necessary for suitably balancing the aberrations of the eyepiece lens. Satisfaction of these parameters ensures overall compactness of the eyepiece lens.

The first parameter (1.2<f1/f<3.5) provides the relationship between the focal length of the positive power first lens group G1 and the overall focal length of the eyepiece lens necessary for a suitable eye relief distance. If the lower limits is exceeded, the first lens group G1 enhances convergence of light rays, which makes the eye relief distance of the eyepiece lens too short, and increases aggravation of distortion. On the other hand, if the upper limit is exceeded, while reducing aggravation of distortion, it must be followed by large diameter lenses due to power convergence of light rays.

The second parameter (3<-f2/f) provides the relationship between the focal length of the negative power second lens group G2 and the overall focal length of the eyepiece lens necessary for suitable compactness of the third lens group G3. If the limit is exceeded, the second lens group G2 increases its negative power too strong, so as to diverge light rays drastically. In consequence, lens elements as large as sufficient to cover the diverging light rays have to be employed for the third lens group G3. Further, the second parameter is unsatisfaction, while the negative power second lens group G2 reduces astigmatism and distortion, it increases aggravation of aberrations other than astigmatism and distortion.

The third parameter (0.010<1/$\upsilon_{2N}$-1/$\upsilon_{2P}$) yields the distribution of color dispersion necessary for preventing or significantly reducing aggravation of axial chromatic aberrations and chromatic difference of magnification.

The last parameter (1<|R3/f|) defines an incident angle of light rays upon the second lens group G2 necessary for suitably balancing the aberrations of the eyepiece lens.

In the following tables, various embodiments of the invention are set forth with the parameters of the invention. In the following prescription tables, the reference L followed by an Arabic numeral indicates the lens element progressively from the object end to the end of eyes. The reference radius numbers R are the progressive lens surface radii. Positive surface radii are struck from the right of the eyepiece lens surface on the optical axis. Negative surface radii are struck from the left of the eyepiece lens surface on the optical axis. The reference D followed by an arabic numeral indicates the axial distance between adjacent lens surfaces, namely the air space or the lens thickness, progressively from the object end to the image end. Nd is the index of refraction of the lens element with respect to d-line ($\lambda$=587.6 nm). υd is the dispersion of the lens element as measured by the Abbe number. hmax/f indicates the diameter of the largest lens element.

An eyepiece lens as shown in FIG. 2 scaled to the overall focal length of 20 mm is substantially described in Table I.

TABLE I

| Element | Radius of Curvature (mm) | Axial Distance Between Surfaces (mm) | Nd | υd |
|---|---|---|---|---|
| L1 | R1 = −141.075 | | | |
|  | | D1 = 4.967 | 1.58913 | 61.2 |
|  | R2 = −24.089 | | | |
|  | | D2 = 3.368 | | |
|  | R3 = −35.537 | | | |
| L2 | | D3 = 2.396 | 1.78472 | 25.4 |
|  | R4 = 30.822 | | | |
|  | | D4 = 0 | | |
|  | R5 = 30.822 | | | |
| L3 | | D5 = 8.048 | 1.58913 | 61.2 |
|  | R6 = −30.822 | | | |
|  | | D6 = 0.516 | | |
|  | R7 = 50.228 | | | |
| L4 | | D7 = 4.287 | 1.58913 | 61.2 |
|  | R8 = −151.866 | | | |
|  | | D8 = 0.516 | | |
|  | R9 = 23.117 | | | |
| L5 | | D9 = 5.549 | 1.58913 | 61.2 |
|  | R10 = ∞ | | | |
| E.P. | | D10 = 15.980 (Eye Relief Distance) | | |

| f1/f | −f2/f | 1/ν2N − 1/ν2P | \|R3/f\| | hmax/f | Angel of View (°) |
|---|---|---|---|---|---|
| 2.43 | 8.11 | 0.023 | 1.78 | 0.63 | 65 |

As apparent from Table I, the eyepiece lens satisfies the conditions (1) through (4) and has a wide angle of view of 65° and a lens diameter ratio (which is the ratio of the distance of a principal ray passing through an eye point at a specified incident angle from the optical axis at the lens relative to the focal length of the lens and indicates compactness of the eyepiece lens) 0.63, which provides the overall compactness of the eyepiece lens and a wide angle of view greater than 65°.

Figure 8A:
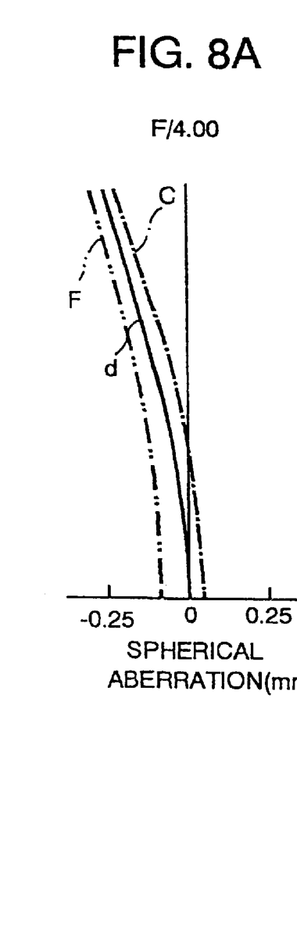
FIGS. 8A, 8B and 8C are graphs showing spherical aberrations for F-line, d-line and c-line, astigmatism and distortion of the wide-angle eyepiece lens shown in FIG. 2, respectively.
Figure 8B:
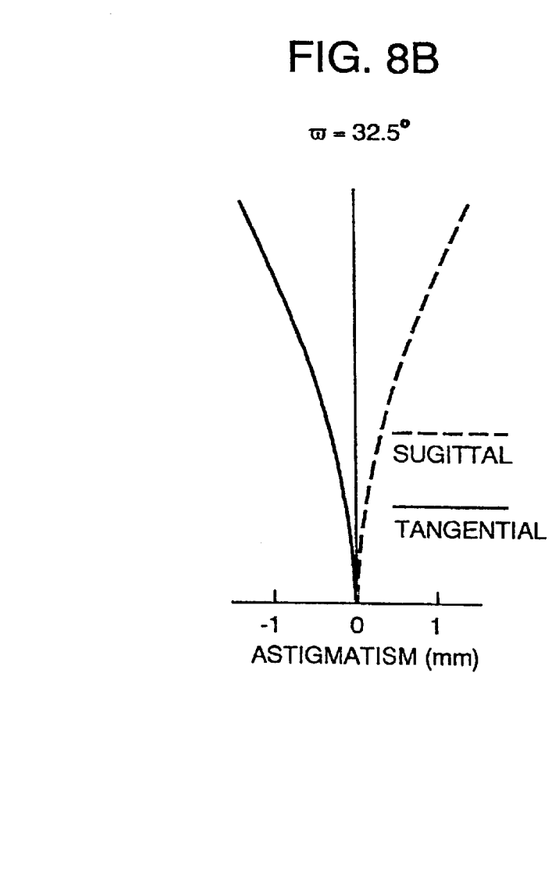
Figure 8C:
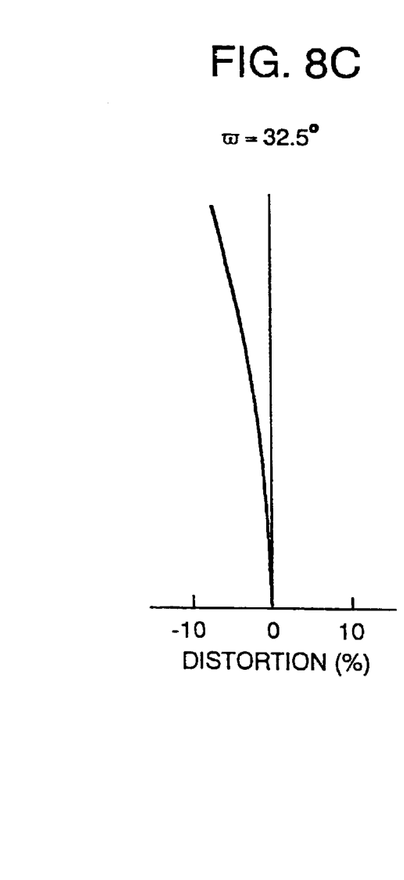

FIGS. 8A, 8B and 8C show spherical aberrations for F-line, d-line and c-line, astigmatism and distortion, respectively. As apparent from FIGS. 8A, 8B and 8C, the eyepiece lens provides well balanced distribution of aberrations.

Figure 3:
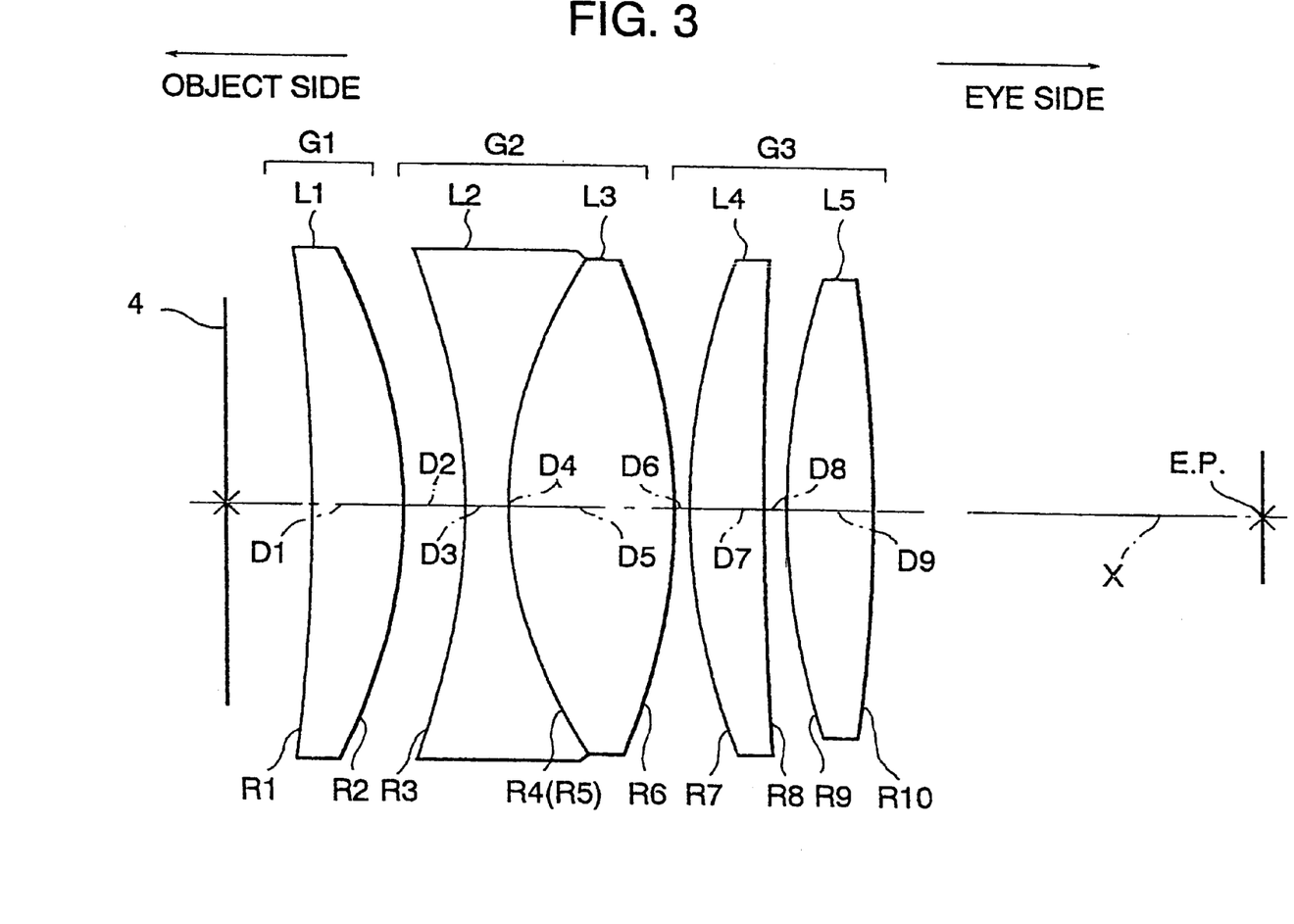
FIG. 3 is a schematic side view of a wide-angle eyepiece lens according another embodiment of the invention.

FIG. 3 shows a wide-angle eyepiece lens according to another embodiment of the invention. The eyepiece lens 2 includes, in order from the object side, a positive power first lens group G1, an overall negative power second lens group G2 and an overall positive power third lens group G3. The first lens group G1 comprises a positive meniscus lens element L1 with a concave object side surface. The second lens group G2 is an overall negative power doublet comprising a positive and a negative lens element, such as a positive biconcave lens element L2 with a large curvature at the eye side surface and a bi-convex lens element L3 with a large curvature at the object side surface arranged in order from the object side. The third lens group G3 includes a positive meniscus lens element L4 with a convex object side surface and a bi-convex lens element L5 with a large curvature at the object side surface.

An eyepiece lens as shown in FIG. 3 scaled to the overall focal length of 20 mm is substantially described in Table II.

TABLE II

| Element | Radius of Curvature (mm) | Axial Distance Between Surfaces (mm) | Nd | υd |
|---|---|---|---|---|
| L1 | R1 = −57.096 | | | |
|  | | D1 = 4.615 | 1.58913 | 61.2 |
|  | R2 = −22.788 | | | |
|  | | D2 = 3.439 | | |
|  | R3 = −106.375 | | | |
| L2 | | D3 = 2.395 | 1.78472 | 25.4 |
|  | R4 = 19.561 | | | |
|  | | D4 = 0 | | |
|  | R5 = 19.561 | | | |
| L3 | | D5 = 8.609 | 1.58913 | 61.2 |
|  | R6 = −44.252 | | | |
|  | | D6 = 0.515 | | |
|  | R7 = 27.494 | | | |
| L4 | | D7 = 4.826 | 1.71300 | 53.9 |
|  | R8 = −145.489 | | | |
|  | | D8 = 0.515 | | |
|  | R9 = 45.396 | | | |
| L5 | | D9 = 4.430 | 1.71300 | 53.9 |
|  | R10 = −132.470 | | | |
| E.P. | | D10 = 16.500 (Eye Relief Distance) | | |

| f1/f | −f2/f | 1/ν2N − 1/ν2P | \|R3/f\| | hmax/f | Angel of View (°) |
|---|---|---|---|---|---|
| 3.07 | 18.05 | 0.023 | 5.32 | 0.64 | 65 |

As apparent from Table I, the eyepiece lens satisfies the conditions (1) through (4) and has a wide angle of view of 65° and a ratio of the diameter of the largest lens relative to the overall focal length of the eyepiece lens of 0.64, which provides the overall compactness of the eyepiece lens and a wide angle of view greater than 65°.

Figure 9A:
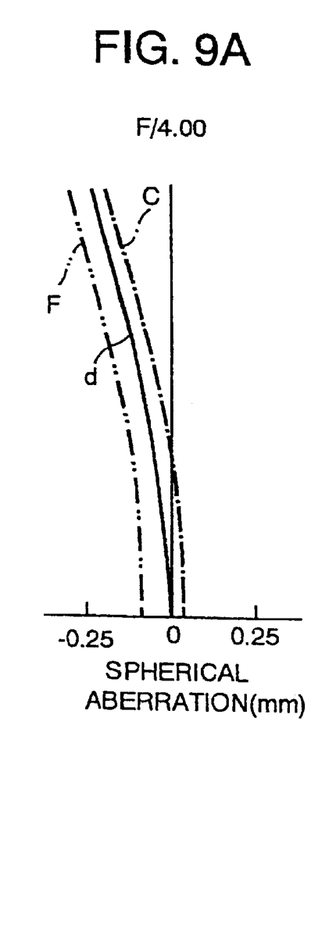
FIGS. 9A, 9B and 9C are graphs showing spherical aberrations for F-line, d-line and c-line, astigmatism and distortion of the wide-angle eyepiece lens shown in FIG. 3, respectively.
Figure 9B:
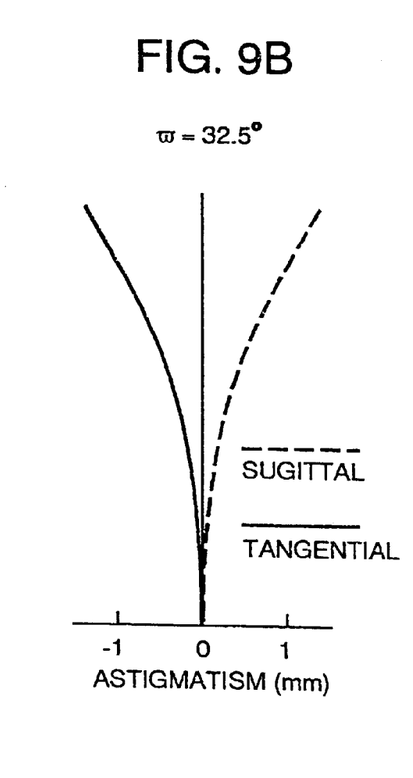
Figure 9C:
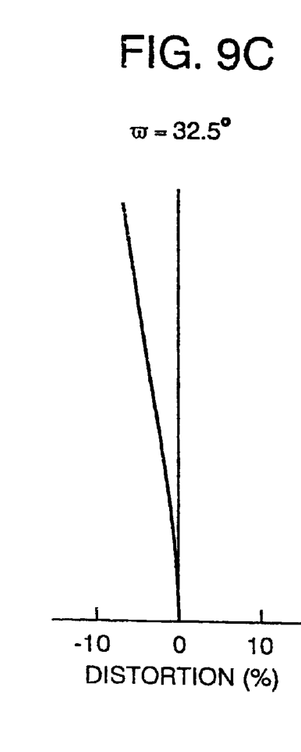

FIGS. 9A, 9B and 9C show spherical aberrations for F-line, d-line and c-line, astigmatism and distortion, respectively. As apparent from FIGS. 9A, 9B and 9C, the eyepiece lens provides well balanced distribution of aberrance.

Figure 4:
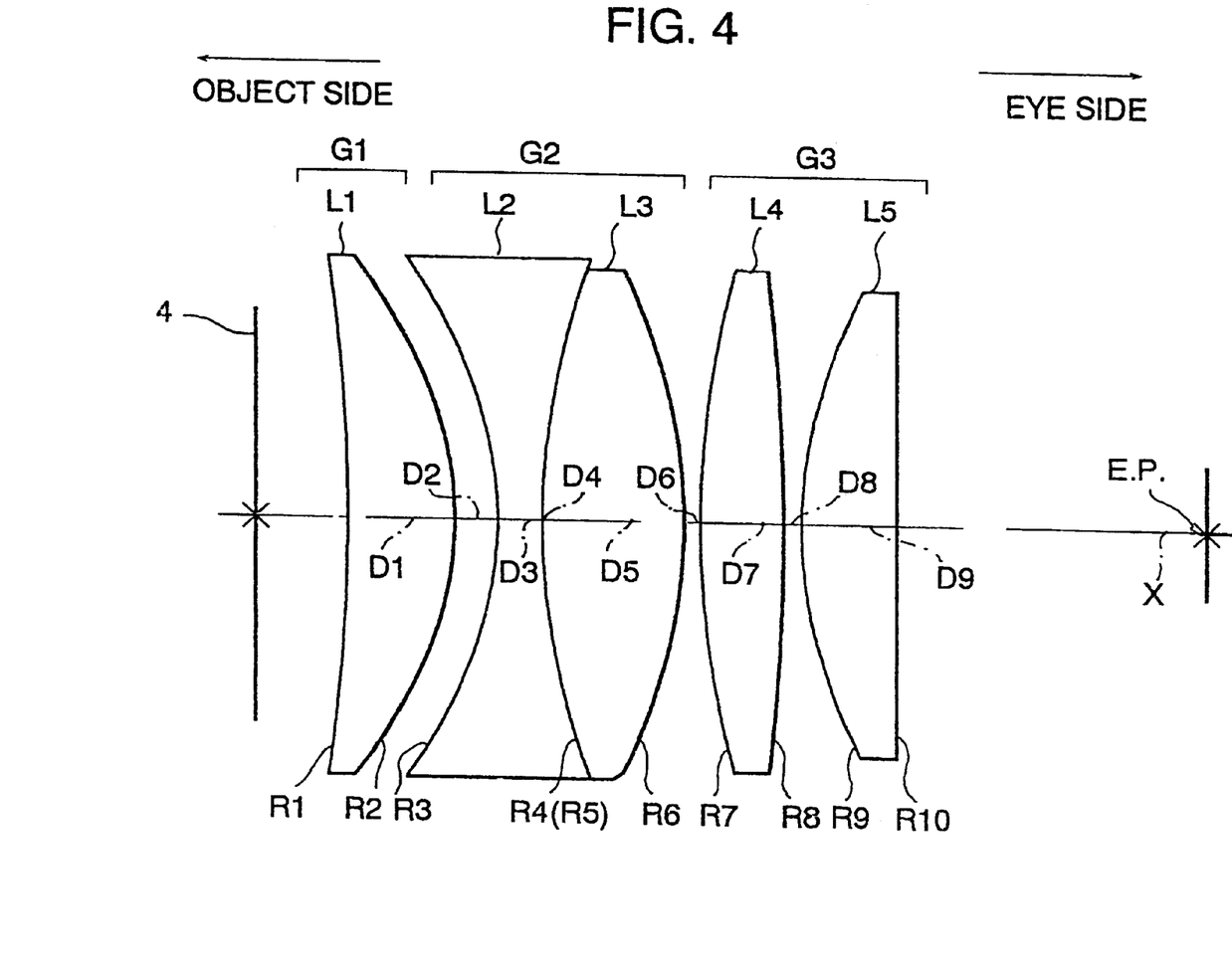
FIG. 4 is a schematic side view of a wide-angle eyepiece lens according still another embodiment of the invention.

FIG. 4 shows a wide-angle eyepiece lens according to still another embodiment of the invention. The eyepiece lens 2 is similar to that shown in FIG. 2 excepting that an overall negative power second lens group G2 includes a doublet comprising a positive biconcave lens element L2 with a large curvature at the object side surface and a bi-convex lens element L3 with a large curvature at the eye side surface arranged in order from the object side.

An eyepiece lens as shown in Figure III scaled to the overall focal length of 20 mm is substantially described in Table III.

TABLE III

| Element | Radius of Curvature (mm) | Axial Distance Between Surfaces (mm) | Nd | υd |
|---|---|---|---|---|
| L1 | R1 = −88.049 | | | |
|  | | D1 = 5.685 | 1.58913 | 61.2 |
|  | R2 = −18.933 | | | |
|  | | D2 = 2.603 | | |
|  | R3 = −21.282 | | | |
| L2 | | D3 = 2.393 | 1.78473 | 25.4 |
|  | R4 = 50.877 | | | |
|  | | D4 = 0 | | |
|  | R5 = 50.877 | | | |
| L3 | | D5 = 7.464 | 1.58913 | 61.2 |
|  | R6 = −26.488 | | | |
|  | | D6 = 0.515 | | |
|  | R7 = 62.537 | | | |

TABLE III-continued

| | | | | |
|---|---|---|---|---|
| L4 | | D7 = 4.514 | 1.58913 | 61.2 |
| | R8 = −77.998 | | | |
| | | D8 = 0.515 | | |
| | R9 = 23.988 | | | |
| L5 | | D9 = 5.326 | 1.58913 | 61.2 |
| | R10 = ∞ | | | |
| E.P. | | D10 = 15.500 (Eye Relief Distance) | | |

| f1/f | −f2/f | 1/ν2N − 1/ν2P | \|R3/f\| | hmax/f | Angel of View (°) |
|---|---|---|---|---|---|
| 2.00 | 3.76 | 0.023 | 1.06 | 0.63 | 65 |

As apparent from Table III, the eyepiece lens satisfies the conditions (1) through (4) and has a wide angle of view of 65° and a ratio of the diameter of the largest lens relative to the overall focal length of the eyepiece lens of 0.63, which provides the overall compactness of the eyepiece lens and a wide angle of view greater than 65°.

Figure 10A:
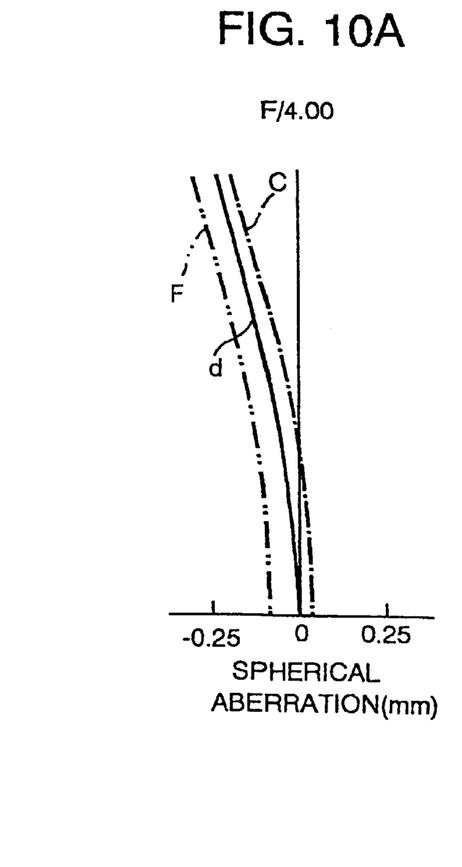
FIGS. 10A, 10B and 10C are graphs showing spherical aberrations for F-line, d-line and c-line, astigmatism and distortion of the wide-angle eyepiece lens shown in FIG. 4, respectively.
Figure 10B:
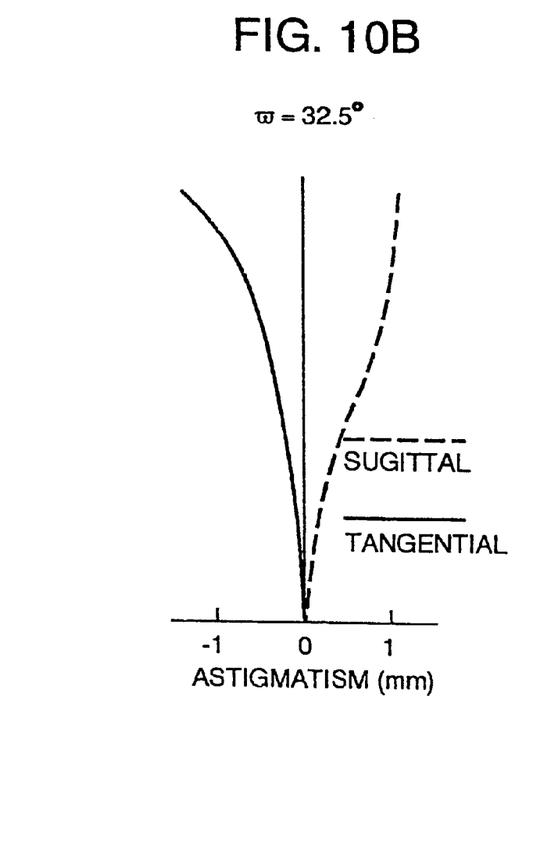
Figure 10C:
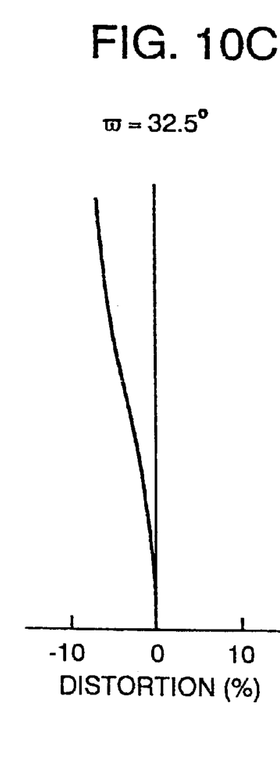

FIGS. 10A, 10B and 10C show spherical aberrations for F-line, d-line and c-line, astigmatism and distortion, respectively. As apparent from FIGS. 10A, 10B and 10C, the eyepiece lens provides well balanced distribution of aberrance.

Figure 5:
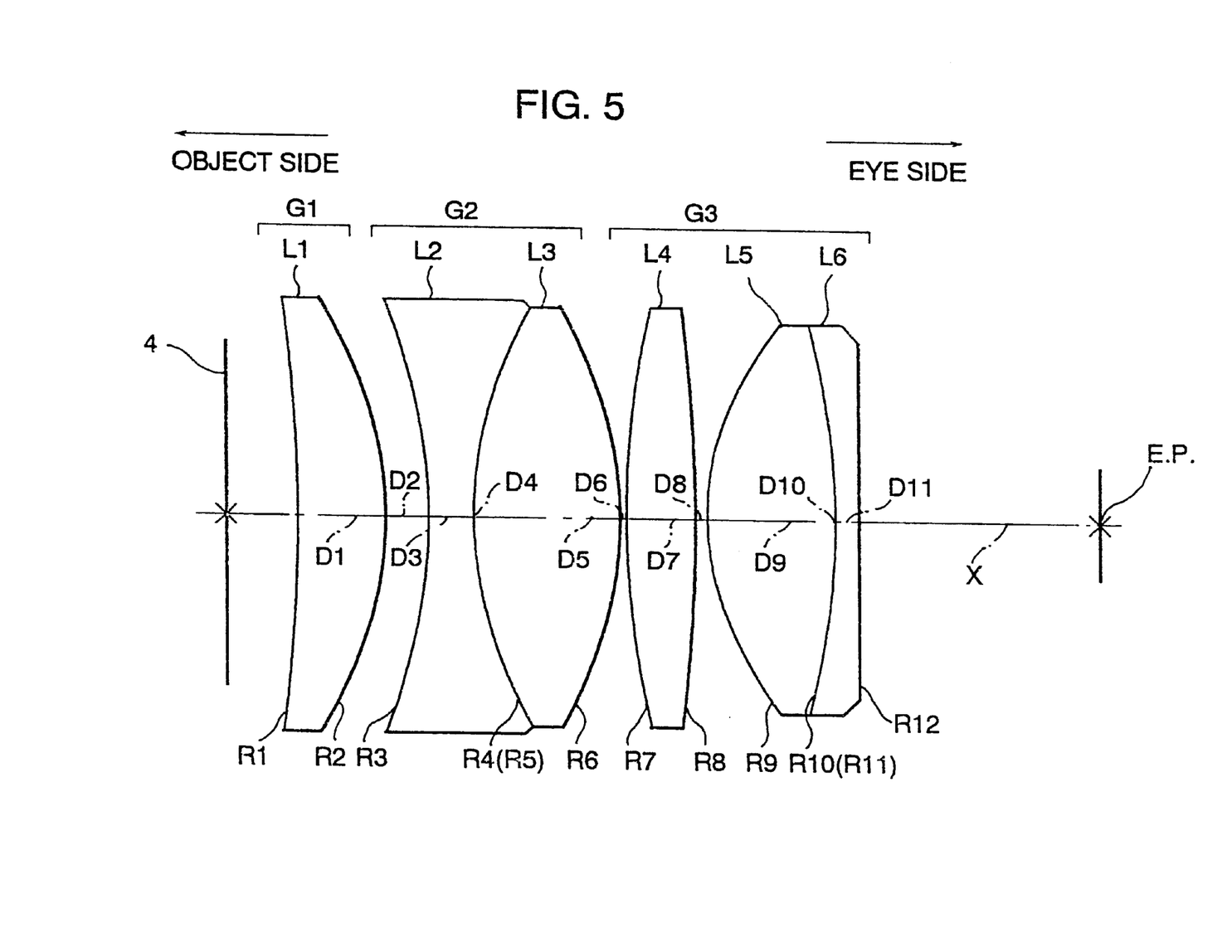
FIG. 5 is a schematic side view of a wide-angle eyepiece lens according yet another embodiment of the invention.

FIG. 5 shows a wide-angle eyepiece lens according to yet another embodiment of the invention. The eyepiece lens 2 is similar to that shown in FIG. 4 excepting that an overall positive power third lens group G3 includes three lens elements, namely a bi-convex lens element L4 with a large curvature at the object side surface followed by an overall positive power doublet comprising a bi-convex lens element L5 with a large curvature at the object side surface and a piano-concave lens element L6 arranged in order from the object side.

An eyepiece lens as shown in FIG. 5 scaled to the overall focal length of 20 mm is substantially described in Table IV.

TABLE IV

| Element | Radius of Curvature (mm) | Axial Distance Between Surfaces (mm) | Nd | νd |
|---|---|---|---|---|
| L1 | R1 = −69.275 | D1 = 5.200 | 1.58913 | 61.2 |
| | R2 = −20.446 | D2 = 2.151 | | |
| L2 | R3 = −24.758 | D3 = 2.393 | 1.71736 | 29.5 |
| | R4 = 35.532 | D4 = 0 | | |
| L3 | R5 = 35.532 | D5 = 8.337 | 1.58913 | 61.2 |
| | R6 = −29.873 | D6 = 0.515 | | |
| L4 | R7 = 61.318 | D7 = 4.693 | 1.58913 | 61.2 |
| | R8 = −88.652 | D8 = 0.515 | | |
| L5 | R9 = 23.412 | D9 = 7.052 | 1.58913 | 61.2 |
| | R10 = −51.480 | D10 = 0 | | |
| | R11 = −51.480 | | | |
| L6 | R12 = ∞ | D11 = 1.544 | 1.64769 | 33.8 |
| E.P. | | D12 = 15.500 (Eye Relief Distance) | | |

| f1/f | −f2/f | 1/ν2N − 1/ν2P | \|R3/f\| | hmax/f | Angel of View (°) |
|---|---|---|---|---|---|
| 2.37 | 5.67 | 0.018 | 1.24 | 0.67 | 65 |

As apparent from Table IV, the eyepiece lens satisfies the conditions (1) through (4) and has a wide angle of view of 65°, which provides the overall compactness of the eyepiece lens and a wide angle of view greater than 65°.

Figure 11A:
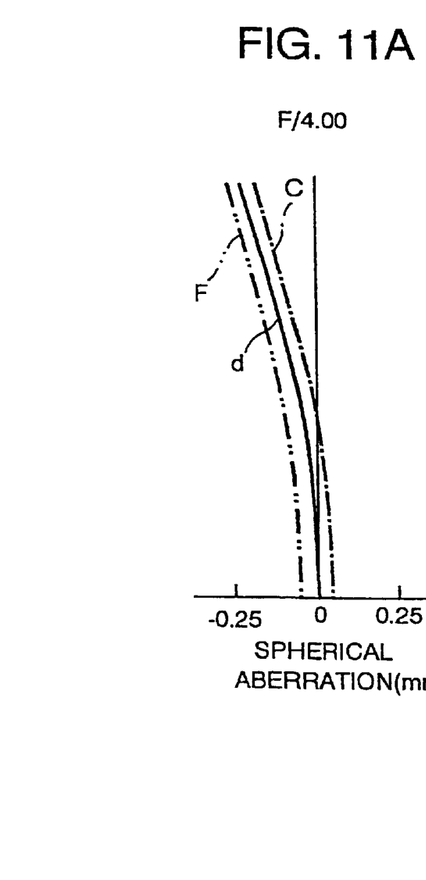
FIGS. 11A, 11B and 11C are graphs showing spherical aberrations for F-line, d-line and c-line, astigmatism and distortion of the wide-angle eyepiece lens shown in FIG. 5, respectively.
Figure 11B:
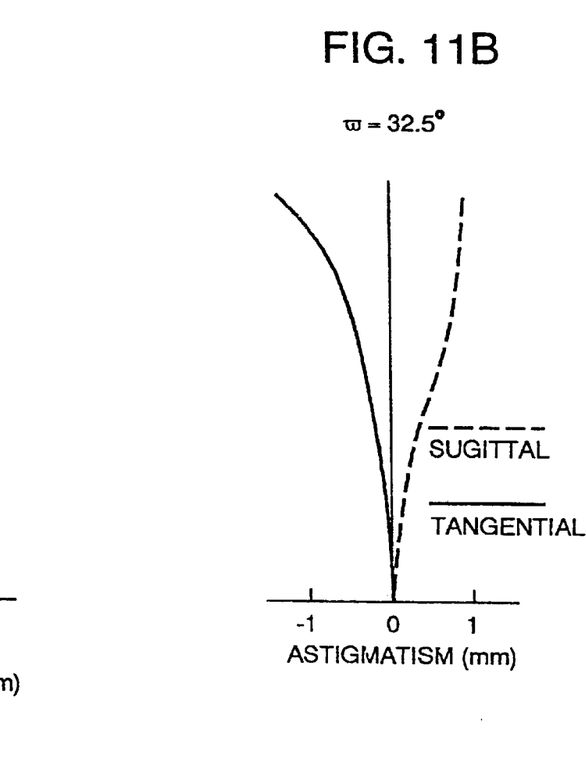
Figure 11C:
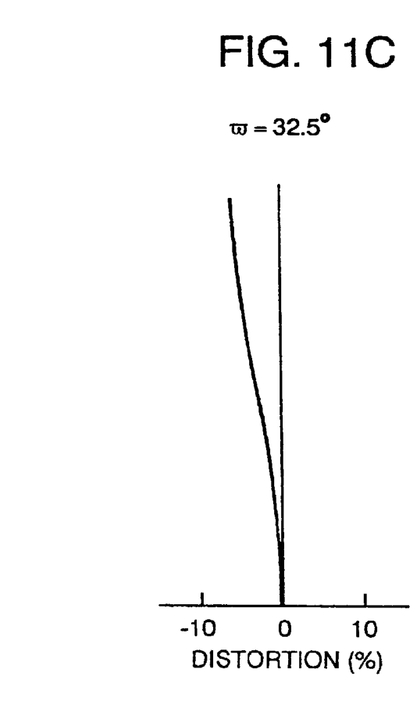

FIGS. 11A, 11B and 11C show spherical aberrations for F-line, d-line and c-line, astigmatism and distortion, respectively. As apparent from FIGS. 11A, 11B and 11C, the eyepiece lens provides well balanced distribution of aberrance.

Figure 6:
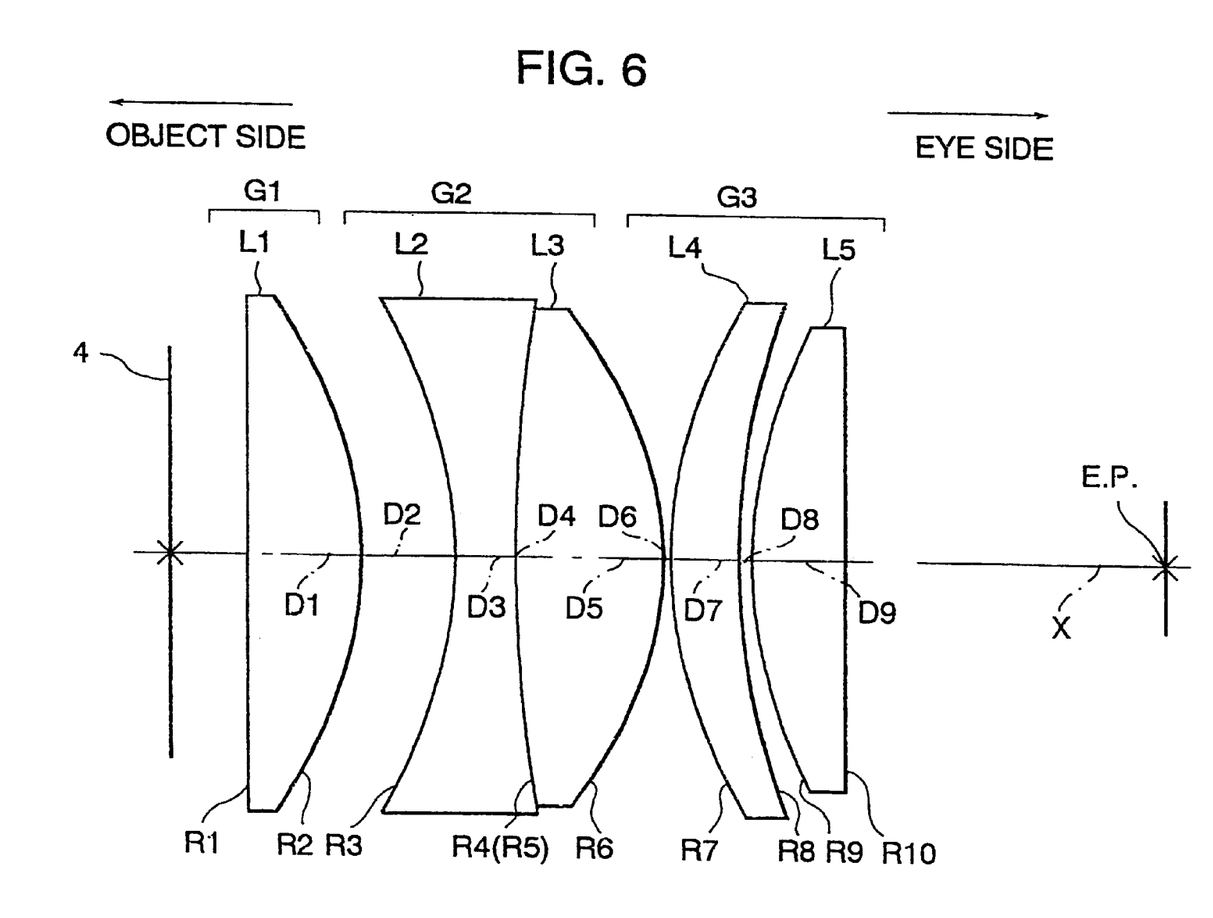
FIG. 6 is a schematic side view of a wide-angle eyepiece lens according a further embodiment of the invention.

FIG. 6 shows a wide-angle eyepiece lens according to a further embodiment of the invention. The eyepiece lens 2 is similar to that shown in FIG. 4 excepting that a first lens group G1 includes a single lens L1 with an aspherical eye side surface and an overall positive power third lens group G3 includes a positive meniscus lens element L4 with a positive eye side surface and a bi-convex lens element L5 with a large curvature at the object side surface arranged in order from the object side.

The aspherical surface may be defined by the following equation:

$$Z = \frac{Ch^2}{1 + \sqrt{1 - KC^2h^2}} + a_4h^4 + a_6h^6 + a_8h^8 + a_{10}h^{10}$$

where
Z is the surface sag at a semi-aperture distance h from the axis X of the eyepiece lens;
C is the para-axial curvature of a lens surface at optical axis A at the optical axis;
K is a conic constant;
$a_4, a_4, a_4, a_{10}$ is the aspherical coefficient.

An eyepiece lens as shown in FIG. 6 scaled to the overall focal length of 20 mm is substantially described in Table V in which the aspherical surface is marked by an asterisk.

TABLE V

| Element | Radius of Curvature (mm) | Axial Distance Between Surfaces (mm) | Nd | νd |
|---|---|---|---|---|
| L1 | R1 = −206.444 | D1 = 5.913 | 1.58913 | 61.2 |
| | R2 = −16.721 | D2 = 5.023 | | |
| L2 | R3 = −25.048 | D3 = 2.399 | 1.78473 | 25.4 |
| | R4 = 75.446 | D4 = 0 | | |
| L3 | R5 = 75.446 | D5 = 7.964 | 1.58913 | 61.2 |
| | R6 = −21.795 | D6 = 0.516 | | |
| L4 | R7 = 29.884 | D7 = 3.349 | 1.58913 | 61.2 |
| | R8 = −47.544 | D8 = 0.516 | | |
| | R9 = 25.004 | | | |

TABLE V-continued

| | | | | |
|---|---|---|---|---|
| L5 | | D9 = 5.060 | 1.58913 | 61.2 |
| | R10 = −790.668 | | | |
| E.P. | | D10 = 15.500 (Eye Relief Distance) | | |

| f1/f | −f2/f | 1/ν2N − 1/ν2P | \|R3/f\| | hmax/f | Angel of View (°) |
|---|---|---|---|---|---|
| 1.52 | 39.94 | 0.023 | 1.25 | 0.66 | 65 |

As apparent from Table V, the eyepiece lens satisfies the conditions (1) through (4) and has a wide angle of view of 65°, which provides the overall compactness of the eyepiece lens and a wide angle of view greater than 65°.

Figure 12A:
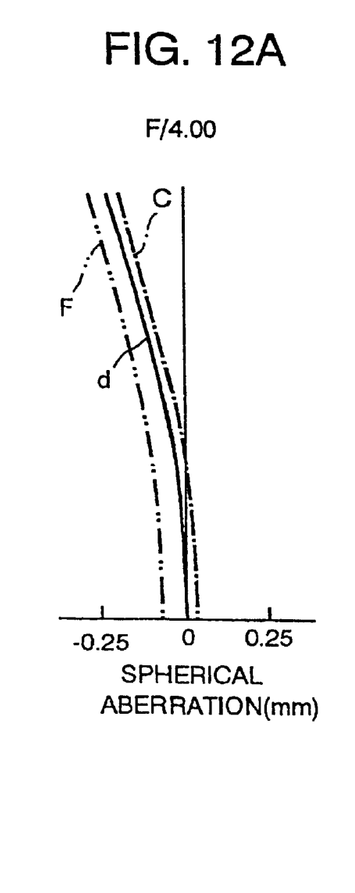
FIGS. 12A, 12B and 12C are graphs showing spherical aberrations for F-line, d-line and c-line, astigmatism and distortion of the wide-angle eyepiece lens shown in FIG. 6, respectively.
Figure 12B:
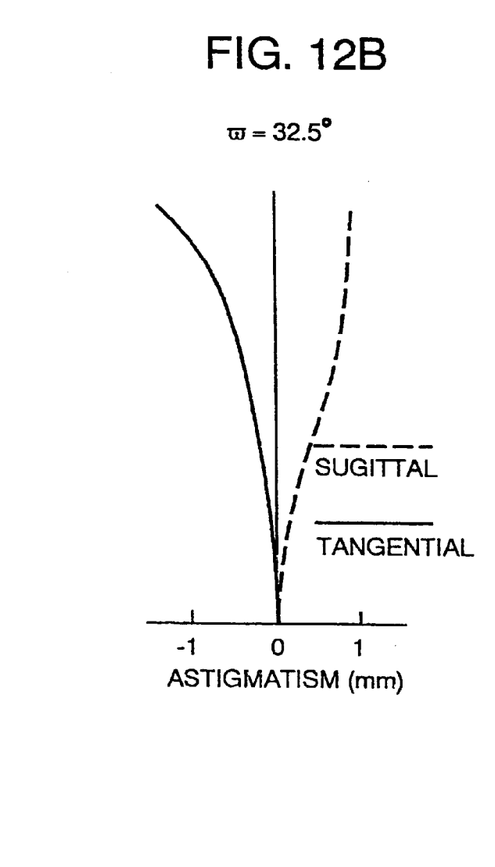
Figure 12C:
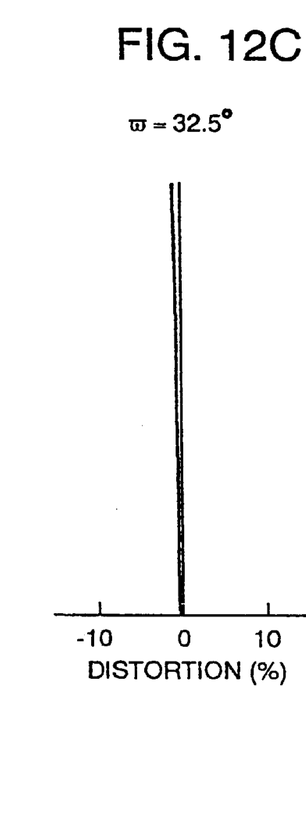

FIGS. 12A, 12B and 12C show spherical aberrations for F-line, d-line and c-line, astigmatism and distortion, respectively. As apparent from FIGS. 12A, 12B and 12C, the eyepiece lens provides well balanced distribution of aberrations. In particular, as seen in FIG. 12C, the aspherical lens element L1 provides a significant reduction of aggravation of distortion of the eyepiece lens.

Figure 7:
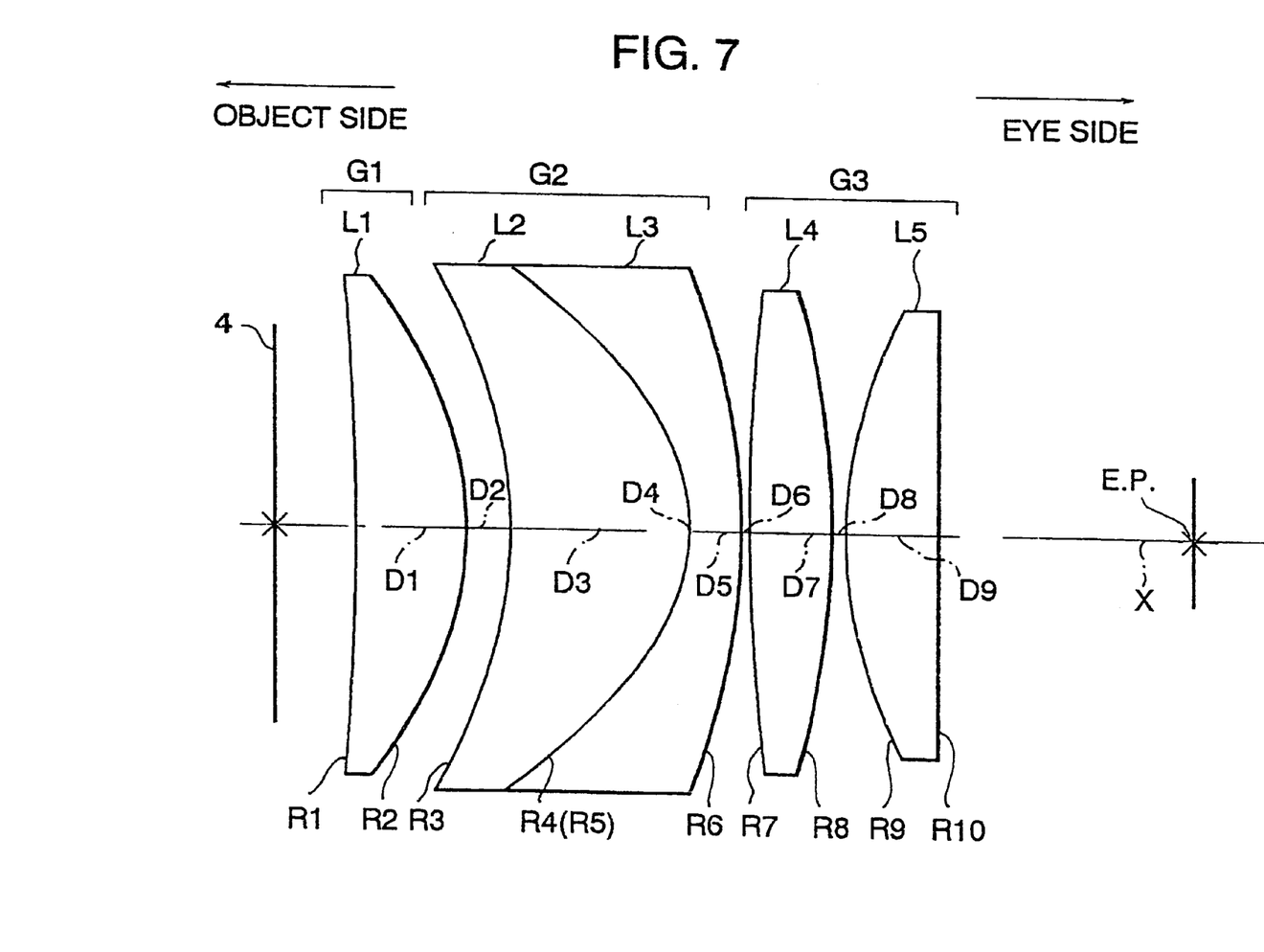
FIG. 7 is a schematic side view of a wide-angle eyepiece lens according a still further embodiment of the invention.

FIG. 7 shows a wide-angle eyepiece lens according to a still further embodiment of the invention. The eyepiece lens 2 includes, in order from the object side, a positive power first lens group G1, an overall negative power second lens group G2 and an overall positive power third lens group G3. The first lens group G1 comprises a positive meniscus lens element L1 with a concave object side surface. The second lens group G2 is an overall negative power doublet comprising a positive meniscus lens element L2 with a concave object side surface and a negative meniscus lens element L3 with a concave object side surface in order from the object side. The third lens group G3 includes a positive bi-convex lens element L4 with a large curvature at the end of eyes and a piano-convex lens element L5 with a convex object side surface.

An eyepiece lens as shown in FIG. 7 scaled to the overall focal length of 20 mm is substantially described in Table VI.

TABLE VI

| Element | Radius of Curvature (mm) | Axial Distance Between Surfaces (mm) | Nd | νd |
|---|---|---|---|---|
| L1 | R1 = −142.510 | | | |
| | | D1 = 5.611 | 1.58913 | 61.2 |
| | R2 = −20.216 | | | |
| | | D2 = 2.213 | | |
| L2 | R3 = −26.513 | | | |
| | | D3 = 9.612 | 1.58913 | 61.2 |
| | R4 = −14.278 | | | |
| | | D4 = 0 | | |
| L3 | R5 = −14.278 | | | |
| | | D5 = 2.050 | 1.78472 | 25.4 |
| | R6 = −36.155 | | | |
| | | D6 = 0.512 | | |
| L4 | R7 = 128.696 | | | |
| | | D7 = 4.491 | 1.58913 | 61.2 |
| | R8 = −38.793 | | | |
| | | D8 = 0.512 | | |
| L5 | R9 = 25.380 | | | |
| | | D9 = 4.835 | 1.58913 | 61.2 |
| | R10 = ∞ | | | |
| E.P. | | D10 = 15.500 (Eye Relief Distance) | | |

| f1/f | −f2/f | 1/ν2N − 1/ν2P | \|R3/f\| | hmax/f | Angel of View (°) |
|---|---|---|---|---|---|
| 1.97 | 4.10 | 0.023 | 1.33 | 0.64 | 65 |

As apparent from Table VI, the eyepiece lens satisfies the conditions (1) through (4) and has a wide angle of view of 65°.

Figure 13A:
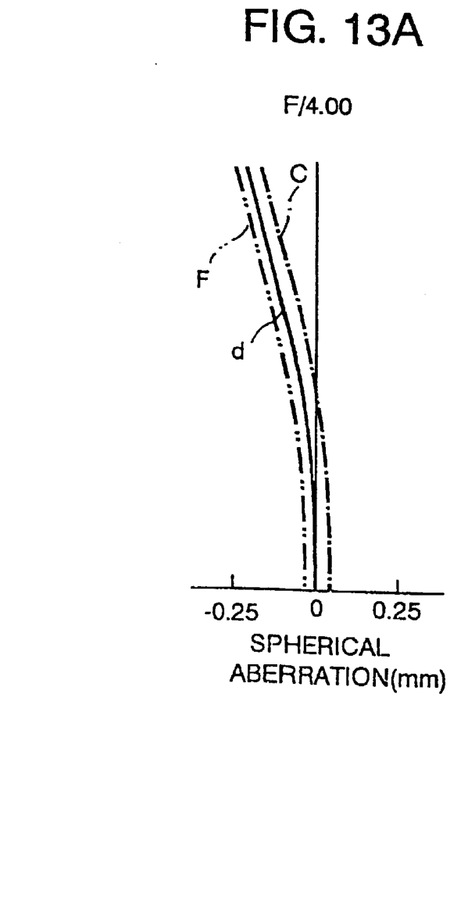
FIGS. 13A, 13B and 13C are graphs showing spherical aberrations for F-line, d-line and c-line, astigmatism and distortion of the wide-angle eyepiece lens shown in FIG. 7, respectively.
Figure 13B:
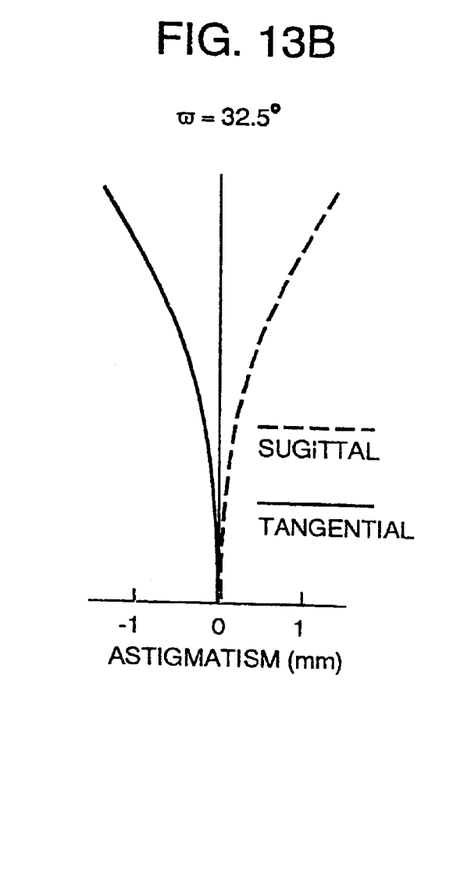
Figure 13C:
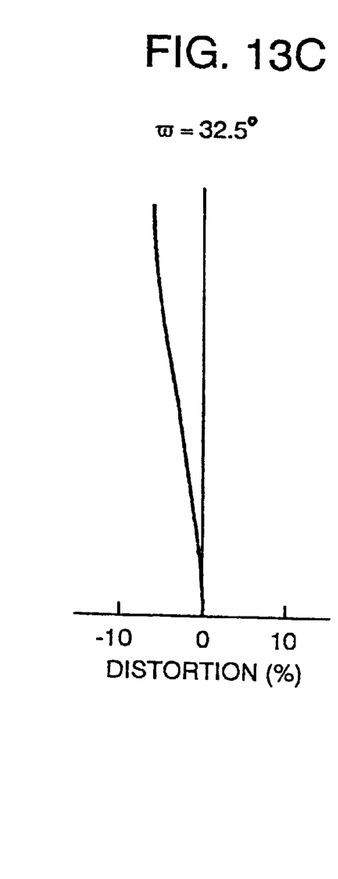

FIGS. 13A, 13B and 13C show spherical aberrations for F-line, d-line and c-line, astigmatism and distortion, respectively. As apparent from FIGS. 8A, 8B and 8C, the eyepiece lens provides well balanced distribution of aberrations.

In any embodiments described above, the lens surface radii and the axial distance between adjacent lens surfaces may be changed according to designs. Further, the lens element L1 of the first lens group G1 may have an aspherical surface not at the eye side but at the object side.

What is claimed is:

1. A wide-angle eyepiece lens, comprising:
   a first lens group including a positive power meniscus lens element with a concave object side surface, wherein an image side of the positive power meniscus lens is not in contact with any other lens;
   an overall negative power second lens group including a doublet comprising, in order from the object side, a negative power lens element and a positive power lens element; and
   an overall positive power third lens group;
   said first to third lens groups being arranged in order from the object side.

2. An wide-angle eyepiece lens as defined in claim 1, wherein said positive power meniscus lens element of said first lens group has an aspherical surface at at least one of opposite sides thereof.

3. The wide-angle eyepiece lens of claim 1, wherein the first lens group has a positive power.

4. The wide-angle eyepiece lens of claim 3, wherein the first lens group consists of the positive power meniscus lens element.

5. A wide-angle eyepiece lens comprising, in order from the object side, a first lens group including a positive power meniscus lens element with a concave object side surface, an overall negative power second lens group including a doublet comprising, in order from the object side, a negative power biconcave lens element and a positive power b-convex lens element, and an overall positive power third lens group, said wide-angle eyepiece lens satisfying the following conditions:

$$1.2 < f_1/f < 3.5$$

$$3 < -f_2/f$$

$$0.010 < 1/\nu_{2N} - 1/\nu_{2P}$$

$$1 < |R_3/f|$$

where
   f is the overall focal length of the eyepiece lens;
   $f_1$ is the overall focal length of the first lens group;
   $f_2$ is the overall focal length of the second lens group;
   $\nu_{2N}$ is the Abbe number of the negative power lens element of the second lens group;
   $\nu_{2P}$ is the Abbe number of the positive lens element of the second lens group;
   $R_3$ is the curvature of radius of the foremost object side surface of the second lens group.

6. An wide-angle eyepiece lens as defined in claim 5, wherein said positive power meniscus lens element of said first lens group has an aspherical surface at at least one of opposite sides thereof.

7. A wide-angle eyepiece lens comprising, in order from the object side, a first lens group including a positive power meniscus lens element with a concave object side surface, an overall negative power second lens group including a doublet comprising, in order from the object side, a positive power meniscus lens element with a object side concave surface and a negative power meniscus lens element with a concave object side surface, and an overall positive power third lens group, said wide-angle eyepiece lens satisfying the following conditions:

$$1.2 < f_1/f < 3.5$$

$$3 < -f_2/f$$

$$0.010 < 1/\upsilon_{2N} - 1/\upsilon_{2P}$$

$$1 < |R_3/f|$$

where f is the overall focal length of the eyepiece lens;

$f_1$ is the overall focal length of the first lens group;

$f_2$ is the overall focal length of the second lens group;

$\upsilon_{2N}$ is the Abbe number of the negative power lens element of the second lens group;

$\upsilon_{2P}$ is the Abbe number of the positive lens element of the second lens group;

$R_3$ is the curvature of radius of the foremost object side surface of the second lens group.

8. An wide-angle eyepiece lens as defined in claim 7, wherein said positive power meniscus lens element of said first lens group has an aspherical surface at at least one of opposite sides thereof.

9. A wide-angle eyepiece lens comprising, in order from the object side, a first lens group including a positive power meniscus lens element with a concave object side surface, an overall negative power second lens group including a doublet comprising, in order from the object side, a positive power meniscus lens element with an object side concave surface and a negative power meniscus lens element with a concave object side surface, and an overall positive power third lens group.

* * * * *